(12) United States Patent
Hasel

(10) Patent No.: US 8,754,732 B2
(45) Date of Patent: Jun. 17, 2014

(54) SOLENOID WITH A TUBE

(75) Inventor: Claus-Peter Hasel, Memmingen (DE)

(73) Assignee: SVM Schultz Verwaltungs-GmbH & Co. KG, Memmingen (DE)

( * ) Notice: Subject to any disclaimer, the term of this patent is extended or adjusted under 35 U.S.C. 154(b) by 0 days.

(21) Appl. No.: 13/330,153

(22) Filed: Dec. 19, 2011

(65) Prior Publication Data

US 2012/0154080 A1 Jun. 21, 2012

(30) Foreign Application Priority Data

Dec. 20, 2010 (DE) .......................... 10 2010 055 209

(51) Int. Cl.
*H01F 7/126* (2006.01)
*F16K 31/06* (2006.01)

(52) U.S. Cl.
CPC ............ *H01F 7/126* (2013.01); *F16K 31/0655* (2013.01); *F16K 31/06* (2013.01)
USPC ................. 335/270; 335/278; 251/129.15

(58) Field of Classification Search
CPC .............................. H01F 7/126; F16K 31/0655
USPC ............. 251/129.08–129.1, 129.15; 335/270, 335/278
See application file for complete search history.

(56) References Cited

U.S. PATENT DOCUMENTS

| 5,608,368 A * | 3/1997 | Ricco et al. .................. 335/281 |
| 6,918,409 B1 * | 7/2005 | Parker ...................... 137/614.11 |
| 2003/0168620 A1 * | 9/2003 | Dralyuk .................... 251/129.15 |
| 2008/0203343 A1 * | 8/2008 | Kratzer ..................... 251/129.15 |

FOREIGN PATENT DOCUMENTS

| DE | 102005056435 A1 | 6/2007 | |
| DE | 102006028437 A1 | 12/2007 | |
| DE | 102007032130 A1 | 1/2009 | |
| DE | 102007036924 A1 | 2/2009 | |
| DE | 102008030453 A1 | 1/2010 | |
| DE | 102009011576 A1 | 9/2010 | |
| EP | 1313110 A2 | 5/2003 | |
| WO | WO 2010053770 A1 * | 5/2010 | ............. F16K 31/06 |

\* cited by examiner

*Primary Examiner* — Ramon Barrera
(74) *Attorney, Agent, or Firm* — Loginov & Sicard; Ken E. Sicard; William A. Loginov

(57) ABSTRACT

The invention refers to a solenoid, comprising a casing. The casing houses a coil body. The coil body supports windings of electrically conducting wire. The coil body surrounds an armature housing containing an armature. The casing wall of the casing has a recess in the area of the armature housing. Between the coil body and the armature housing a tube separated from the casing is arranged. The tube is joined to the inside of the casing wall facing the coil body without roundings.

2 Claims, 1 Drawing Sheet

SOLENOID WITH A TUBE

FIELD OF THE INVENTION

The novel invention refers to a solenoid comprising a casing, wherein the casing houses a coil body and the coil body supports windings of electrically conducting wire, and the coil body surrounds an armature housing containing an armature, and the casing wall of the casing has a recess in the area of the armature housing.

BACKGROUND OF THE INVENTION

Solenoids as described in the beginning are well known in the art. For example, they serve as operating or servo parts for driving valves or the like. The field of application of the solenoids of this type is also very large. For example, they are used in vehicles or aircrafts. Costs and weight, respectively, of the used components have to be taken into consideration in these applications.

In the state of the art constructions of the above-mentioned solenoids are known that can be used when the working pressure occurring in the armature housing is explicitly high (for example of 200 bar and more). Of course, solenoids of this type have to be configured sufficiently pressure-resistant to work reliably and to be leakage-free.

For cost efficient manufacture of the casing, housing single components of the solenoid (coil, connection parts, plugs etc.), state-of-the-art manufacturing methods are employed. Thus, for example, the casing is configured as powder injection molded part. The advantage of using this production method to provide a casing, also called MIM (metal injection molding) or metal powder injection molding, is the fact that by means of these manufacturing methods rather complicated geometrical dimensions can be produced in the casing in a single manufacturing step, if necessary even without additional metal-cutting machining Thus it is convenient, to surround the armature housing with a casing wall that is manufactured in one piece with the further casing.

It has to be taken into consideration, that high pressure prevails in the armature housing that act, of course, also on the walls of the armature housing as well. Behind the casing wall, that seals the armature housing, the coil body is arranged carrying a multitude of windings of wire flown through by electricity. In order to optimize the efficiency of the solenoid of this type, the wall thickness of all casing parts, also the wall thickness of the casing wall surrounding the armature housing is minimized as far as possible. In the bottom and top area of the armature housing, respectively of course, the casing wall surrounding the armature housing joins the rest of the casing wall. The configuration in one piece in this area is advantageous for highly leakproof area. However, in this transition area suitable reinforcements are required at the casing wall surrounding the armature housing, as here the shearing forces or the notching effect is considerable in particular with the very high pressure and the resulting pressure forces.

It is therefore known in this transition area on the side opposite of the armature housing, to provide a reinforcement that is, for example, a rounding or a flute between the casing wall delimiting the solenoid and the casing wall surrounding the armature housing.

Therefore, this reinforcement is in the area where also the coil body is arranged.

The coil body carries windings of the electrically conducting wire, the coil itself is wound automatically. Therefore, the coil is manufactured optimized as ideal cylinder. When compared with modifications without reinforcements, the arrangement of a reinforcement (rounding or flute) consumes construction space in axial direction of the coil in the area where the coil is mounted.

In order to achieve the same mechanic and/or magnetic effect of the high pressure-proof solenoid, the solenoid altogether has to be configured somewhat larger. This results in costs and additional weight which is undesirable in particular applications.

BRIEF SUMMARY OF THE INVENTION

It is an objective of the present invention to improve the state of the art to overcome at least one of the before-mentioned disadvantages.

In order to solve this problem, the invention refers to a solenoid as described in the beginning, and suggests that between coil body and armature housing a tube is arranged separated from the casing, and wherein the tube joins at the inside of the casing wall facing the coil body without roundings.

It is an advantage according to the invention that intentionally a separate component is mounted in the solenoid that defines the armature housing and is itself configured sufficiently pressure-resistant. The tube is accordingly machined as spout, if necessary also by metal-cutting machining, and is itself sufficiently pressure-stiff, and also perfectly configured for the range of application. The coil body is slid on the tube, the tube having on its outside facing the coil body, for example, a cylinder-like, plane surface, at least until the inside of the casing wall delimiting the solenoid. The coil housing is free of roundings such that the coil body can be inserted until the bottom of the floor of the coil housing, that has a groove-like cross section and uses the armature housing optimally, and thus uses the coil housing completely. Thus, the coil housing is configured desirably as groove with parallel extending groove walls, one groove wall being the outside of the tube, the other groove wall being at the inner wall of the casing. The floor of the coil housing is joined desirably rectangular to the groove walls.

The invention proposes to configure the tube from high-performance materials to thus create a pressure-resistant, in particular a high pressure-resistant armature housing that is configured pressure-proof or pressure-resistant for pressures of up to 100 bar, desirably of up to 200 bar, in particular of up to 450 bar.

Skillfully, the tube is configured, at least in sections, as tube pipe, the tube being, for example, cut to length from a tube profile that is open on both sides, or is worked from solid material. The latter makes it possible to provide a pocket recess in the tube with the tube having an opening only on one side. The arrangement of a pocket recess in the tube has in particular the advantage that no additional efforts are necessary to achieve impermeability.

Via the opening, of course, also the armature housing is accessible and the armature supported freely in the armature housing thus acts on a component arranged outside, for example a valve or the like. The tube is inserted in a recess of the casing, the casing encircles, of course, also the opening of the tube. To facilitate joining of components operated by the armature and arranged outside of the solenoid, the tube has in the range of the opening an outer edge, the inner diameter of which being somewhat larger than the diameter of the tube spout or the pocket recess. The tube is accordingly widened in the connection range.

Desirably, the tube is configured as rotational-symmetric component, what makes its metal-cutting machining considerably easier. Furthermore, this design also facilitates mounting the tube, as a particular position of the tube relative to the solenoid is not decisive. Of course, the tube can be equipped, for example, with a positioning device in order to thus define, for example, its position in the solenoid or the casing rotationally, and/or the position of the coil slid on the tube also has to be defined rotationally. A rotational definition means in this context that the angular position of the corresponding element is defined with regard to the coil axis as rotational axis.

In an illustrative embodiment of the invention the recess in the casing wall has a shoulder interacting with the outer wall of the tube. The shoulder is arranged and which the recess such that on the outside of the casing a ring with a larger diameter is arranged that is joined at the inside (facing the coil) to a ring with a small diameter. Therefrom in axial direction (with regard to the coil) a stopper for the tube results, when it is inserted in the casing.

As already described, rather large pressures may prevail in the tube. These also impact the outer edge. These transition areas of the outer edge to the rest of the tube spout can be mechanic weak points, so that it is advantageous to arrange a material reinforcement at the tube wall in the area of the outer edge or the transition area of the tube spout to the outer edge. The material is appropriately reinforced, for example, with a flute or rounding, that, however is located in the casing plane (in the range of the shoulder), and does not reduce the available coil housing for mounting the coil. The suggestion according to the invention shifts the material reinforcement, that may be necessary for constructional reasons, and which is provided by the rounding of the flute to the outside, where it can be provided without changing the constructional space.

In a illustrative embodiment of the invention the casing is configured as powder injection molded part, in particular as metal powder injection molded part. This way of manufacture has the advantage, that in one step even rather complex casing designs can be realized. Even electrically conducting casings can be realized by metal powder injection molding.

To be able to arrange the solenoid at an operation point, for example at a hydraulic or pneumatic line, the casing has an attachment flange at its side facing the recess. In general, the attachment flange is connected in one piece with the casing, for example has also been arranged at the casing during the power injection molding process or the metal powder injection molding process.

BRIEF DESCRIPTION OF THE DIFFERENT VIEWS OF THE DRAWINGS

In the drawing the invention has been shown schematically, in particular in an example. In the figures.

In the figures identical or corresponding elements are indicated by the same reference numbers, and therefore are, if not useful, not described anew.

DETAILED DESCRIPTION OF THE EMBODIMENTS

Figures 1, 2:
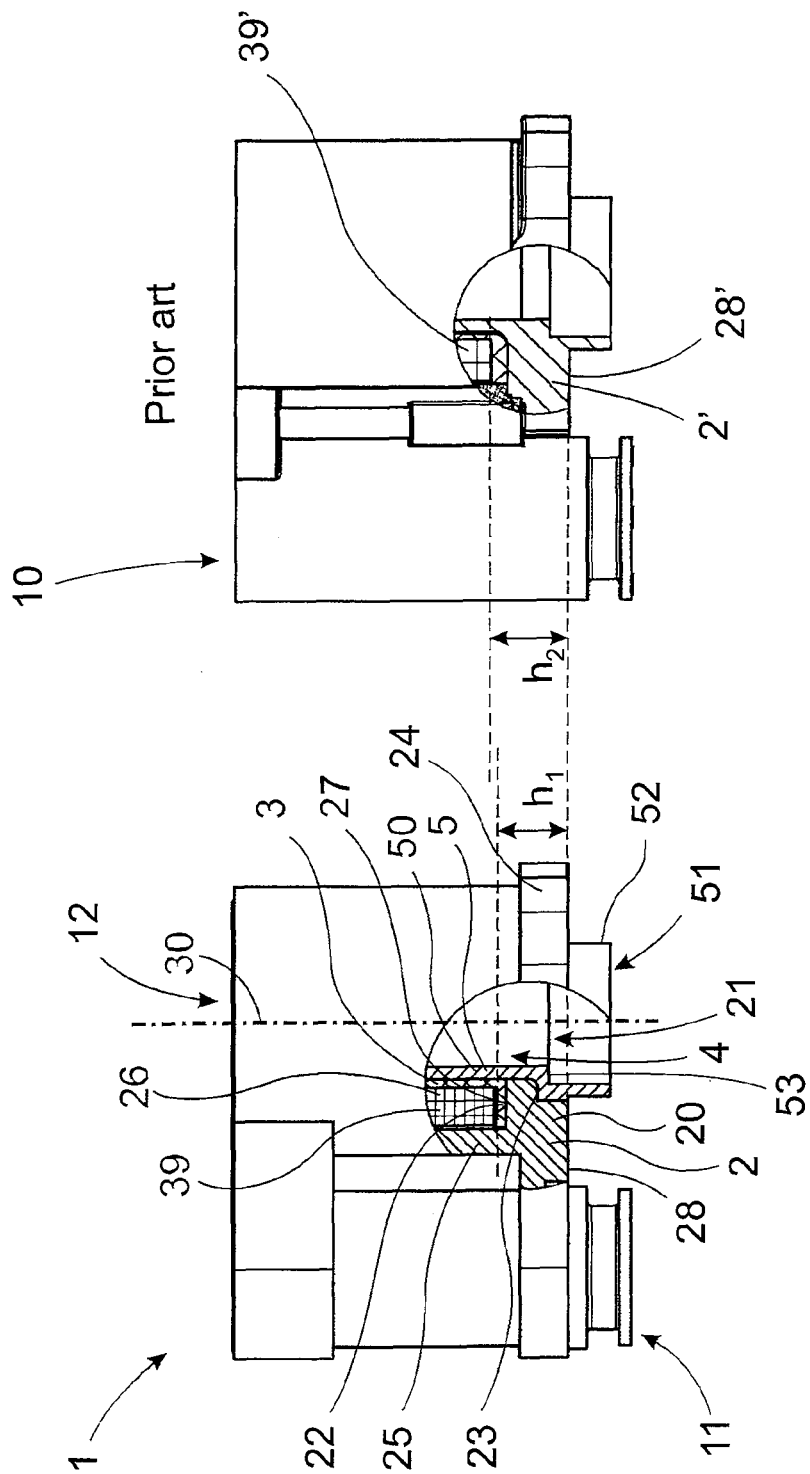
FIG. 1 depicts a solenoid according to the invention in a side view.
FIG. 2 depicts a solenoid according to the state of the art in a side view.

In the drawing the invention is described, in particular by comparing the solenoid 1 according to the invention in FIG. 1 with a suggestion 10 according to the state of the art in FIG. 2.

Solenoids of this type have in a first partial casing a plug-in contact 11, and in a second partial casing 12 the components, for example the armature or the armature rod, acting mechanically due to the generated magnetic field.

Typically, the solenoid comprises an armature housing 4 in which a not-shown armature can move along the coil axis 30. The armature housing 4 is surrounded, at least partly, by a coil body 3. The coil body 3 supports a multitude of wire windings 39 with electrically conducting wire. The connections of the coil are connected electrically conductive with the plug-in contacts in the plug 11. When the wire winding 39 is electrified, a magnetic field is generated in the armature housing 4, acting on the armature, often against the power of a pull-back spring.

In order to make the armature housing 4 high pressure-resistant, it is provided according to the invention that the armature housing 4 is delimited by a tube 5 separated from the casing 2 of the solenoid 1.

The tube 5 consists of a tube spout 50 and an outer edge 52 joined to the outside. It may be gathered that the inner diameter of the outer edge 52 is larger than the inner diameter of the tube spout 50. At the outer edge 52 an appropriate shoulder 53 is formed.

The different components of the solenoid are embedded in the casing 2. The casing 2 has walls that are located inside and outside. An outside casing wall 20 has an appropriate recess 21 through which the tube 5 projects. The tube 5 has again an opening 51 through which the element operated by the solenoid, for example the armature, can act on a structural group, for example a valve, arranged on the outside. With regard to the coil axis 30 an inner casing wall 25 is joined to it radial outside of the coil body 3. Thus, a sleeve-like coil housing 26 is formed that is delimited radial inside by the tube 5 and radial outside by the inner wall 25 of the casing. The inner wall 25 of the casing and the outside of the tube 5 are connected via the floor 27 of the coil housing that is part of the inside 22 of the casing 2. The coil body 3 is slid on the tube 5 together with the wound wire, and is held and guided, respectively, by it. The flange 24, arranged at the casing on the side of the recess 21, serves for fastening the solenoid. The recess 21 is, in the example shown here, not limited by a cylinder-like wall, but has in the inner area, facing the coil body 3, a shoulder 23 directed inwards, that serves as stopper for the tube 5, in particular for the projection 53 that is in contact with the outer edge 52.

According to the invention it is suggested that the floor 27 of the coil housing is connected free from roundings, i.e. essentially rectangular, to the tube 5, that is configured as separate, individual component. Consequently, the available coil housing 26 can be filled and utilized efficiently.

The distance of the wire winding 39' to the exterior surface 28 of the casing 2 is indicated by h1.

In FIG. 2, h2 indicates the analogous distance between the bottom edge of the wire winding 39' to the exterior surface 28' of the casing 2' in a suggestion 10 according to the state of the art. In the drawing, the exterior surfaces 28 and 28', respectively, are congruent with a common basic surface. It can be seen clearly, that the distance h1 according to the invention is smaller than according to the state of the art, where the distance h2 is somewhat larger.

This level difference leads to a correspondingly efficient utilization of the available coil housing and avoids the otherwise required effort.

Although the invention has been described by means of exact examples that have been explained in the very detail, it is pointed out that this serves only for illustration, and that the invention is not necessarily restricted to it, as alternative embodiments and methods may become clear for experts in view of the disclosure. Accordingly, changes are considered that can be made without deviating from the contents of the described invention.

What is claimed is:

1. A solenoid comprising:
a casing;
a coil body that is housed in the casing;
windings of electrically conducting wire that are supported by the coil body;
an armature housing space and associated armature supported within the armature housing space;
the coil body constructed and arranged to at least in part surround the armature housing space that contains the armature;
the casing having a casing wall that defines a recess disposed therein within the area of the armature housing space;
and a tube that is separate from the casing and includes a tube spout having inner and outer sides, and an outer edge;
the tube having an open end at the outer edge and arranged disposed between the coil body and the armature housing space;
the tube spout being disposed in the casing recess and having the outer side thereof supporting the coil body;
the recess having a shoulder in the casing wall interacting with the outer edge of the tube;
wherein the recess has a larger diameter at the opening than inward of the opening to form the shoulder at the recess;
wherein the difference in diameter at the recess forms a substantially right angle shoulder;
wherein the casing has an exterior surface and the tube outer edge extends beyond the exterior surface; and
wherein an inner diameter of the outer edge of the tube is larger than an inner diameter of the tube spout to define a tube shoulder.

2. The solenoid according to claim 1, wherein the casing shoulder mates with the tube shoulder.

\* \* \* \* \*